United States Patent [19]
Clapper

[11] Patent Number: 6,161,072
[45] Date of Patent: Dec. 12, 2000

[54] AUTOMATIC CRUISE CONTROL

[75] Inventor: Edward O. Clapper, Tempe, Ariz.

[73] Assignee: Intel Corporation, Santa Clara, Calif.

[21] Appl. No.: 09/234,991

[22] Filed: Jan. 21, 1999

[51] Int. Cl.[7] .............................. G06G 7/00; H04B 7/185
[52] U.S. Cl. .......................... 701/93; 701/121; 701/213;
701/214; 701/207; 342/357.06; 342/357.08;
342/357.13; 342/357.17; 180/170; 340/905;
340/988
[58] Field of Search .............................. 701/93, 117, 119,
701/207, 208, 213, 214, 96; 342/357.01,
357.06, 357.08, 357.12, 357.13, 457; 340/903,
905, 988; 180/170

[56] References Cited

U.S. PATENT DOCUMENTS 5,454,442  10/1995  Labuhn et al. .......................... 180/169
5,485,161   1/1996  Vaughn .............................. 342/357.06

*Primary Examiner*—William A. Cuchlinski, Jr.
*Assistant Examiner*—Yonel Beaulieu
*Attorney, Agent, or Firm*—Trop, Pruner & Hu, P.C.

[57] ABSTRACT

An automatic cruise control uses stored information about speeds which the vehicle used at given positions in the past to control the speed of the vehicle at a current position. In this way, the vehicle may be caused to travel at speeds in accordance with past driving history of the user. The speeds may be adjusted or overridden by the user. In addition, where a prior driving history is not available, the system can consult a database of given speeds at given locations and those speeds may be used to control the vehicular speed.

22 Claims, 3 Drawing Sheets

AUTOMATIC CRUISE CONTROL

BACKGROUND

This invention relates generally to cruise controls for motor vehicles.

The conventional cruise controls enable the user to set a desired speed which the cruise control implements by providing the necessary acceleration and deceleration to maintain the desired speed. Generally, the cruise control speed is set by the user who actually accelerates or decelerates to the desired speed and then presses an appropriate set button to record the speed as a set point for the cruise control system.

Existing cruise control systems remove some of the tedium involved in driving. However the user must still adjust and readjust the speed as appropriate under different speed limits and different driving conditions.

Thus, there is a continuing need for improved techniques for automatically controlling the speed of motor vehicles.

SUMMARY

In accordance with one embodiment, a method includes determining the position of a vehicle. Based on the vehicle's position, information may be automatically provided that suggests a vehicular speed.

DETAILED DESCRIPTION

Figure 1:
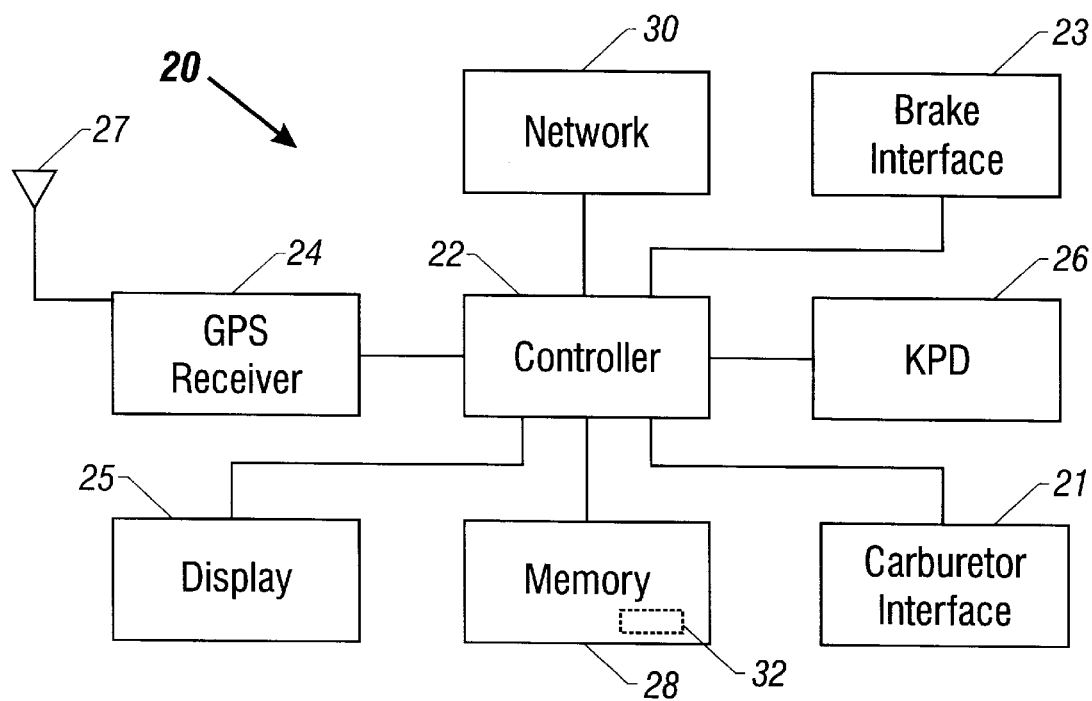
FIG. 1 is a block diagram of an automatic speed control system in accordance with one embodiment of the present invention.

An automatic cruise control 20, shown in FIG. 1, may be adapted to automatically control the speed of a vehicle based on the vehicle's current position. The vehicle's current position may be determined using electronic position locating apparatus such as a global positioning system (GPS) receiver 24. The receiver 24 may be coupled to an antenna 27 to provide information about the current position of the vehicle.

A memory 28 coupled to a controller 22 may provide information about speeds used at given locations in the past. For example, a given driver may drive the same route to work repeatedly. Based on prior history and detected current position, the automatic cruise control 20 may set the vehicle's speed based on the speed that the driver used previously at the same location. This may reduce the amount of effort that the driver must invest in continually changing speed or resetting the cruise control.

The driver's previous speed may be determined by traffic conditions, road situations and speed limits. Often the same conditions will repeat at the same time, day after day. The system may store speeds that were used at given times and automatically apply those speeds at given locations at the same or most similar times previously recorded. The vehicle may be operated at one speed at one time and a different speed at a different time (at the same location) when driving conditions, including traffic congestion, may be different.

The controller 22 may also receive inputs from a keypad 26. For example, the user can provide inputs which override the previous driving conditions. Also, additional information may be obtained from a network 30 which may, for example, be a modem coupling to a database. The database may be found at an Internet website and may be contacted using a modem and cellular telephone connection, in one embodiment of the invention. The website may provide information about current driving conditions which may be used to moderate the user's previous history. For example, if it is snowing the stored speeds may be reduced. In addition, the website may provide speed limit information which may be used to propose a speed to the operator when traveling in locations which the user has never before traveled.

A brake interface 23 and a carburetor interface 21 may be provided to enable the controller 22 to control vehicle speed. A display 25 may provide speed information and a key pad 26 enables the user to input information for the controller.

Figure 2:
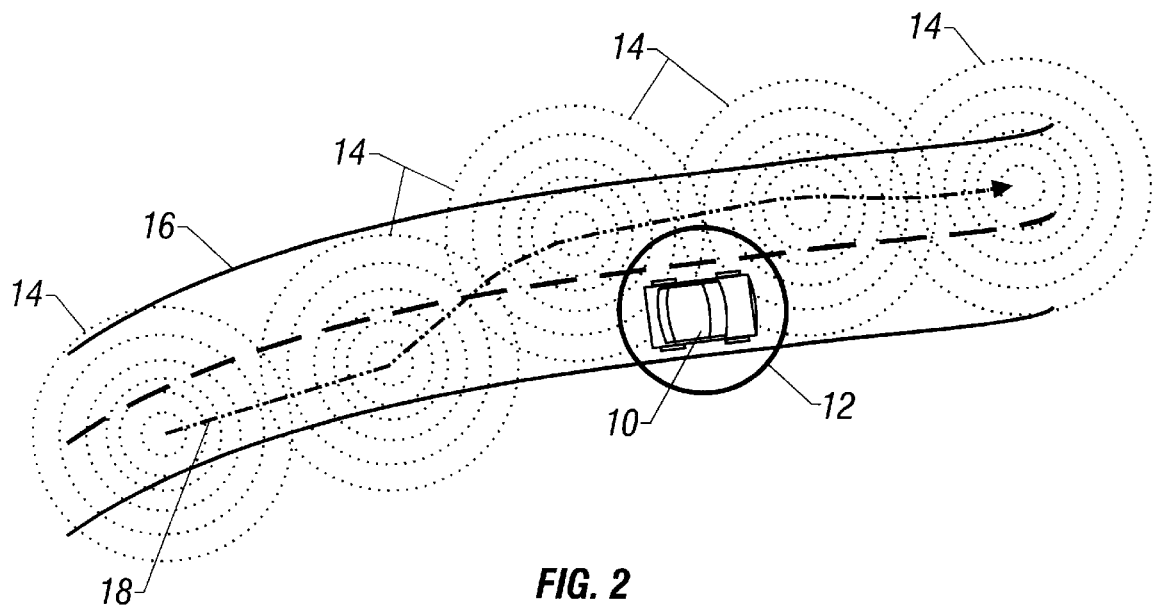
FIG. 2 is a diagrammatic top plan view of a vehicle moving along a roadway.

Thus, referring to FIG. 2, a vehicle 10 traveling down a road 16 may have a recorded series of locations which include the vehicle's exact location and a ring 14 or tolerance around that location. Thus, the vehicle may travel a path 18 on one day. Even though the vehicle may travel in a different lane on another day, since the other lane (as illustrated in FIG. 2) still intersects the ring 14, the new path would be detected as corresponding to the same path 18 which was followed previously. This avoids constantly resetting the memory and learning new speeds for every small variation in the vehicle's path of travel.

In some embodiments, it may be desirable to use the controller 22 as a governor which prevents exceeding given speed conditions. For example, a governor may prevent the user from exceeding previous speed conditions or from exceeding preset database speeds which may be correlated, for example, to speed limits on given roads.

In some embodiments, a database with actual speed limit data may be provided. In one embodiment, the user may also be able to override the speed limit data and to exceed the speed limit by a given amount, or if the user prefers, to travel at a speed below the speed limit by a predetermined amount. The operator may input a customized profile that adjusts the system's suggested speeds, using the speed limit data as a reference.

Figure 3:
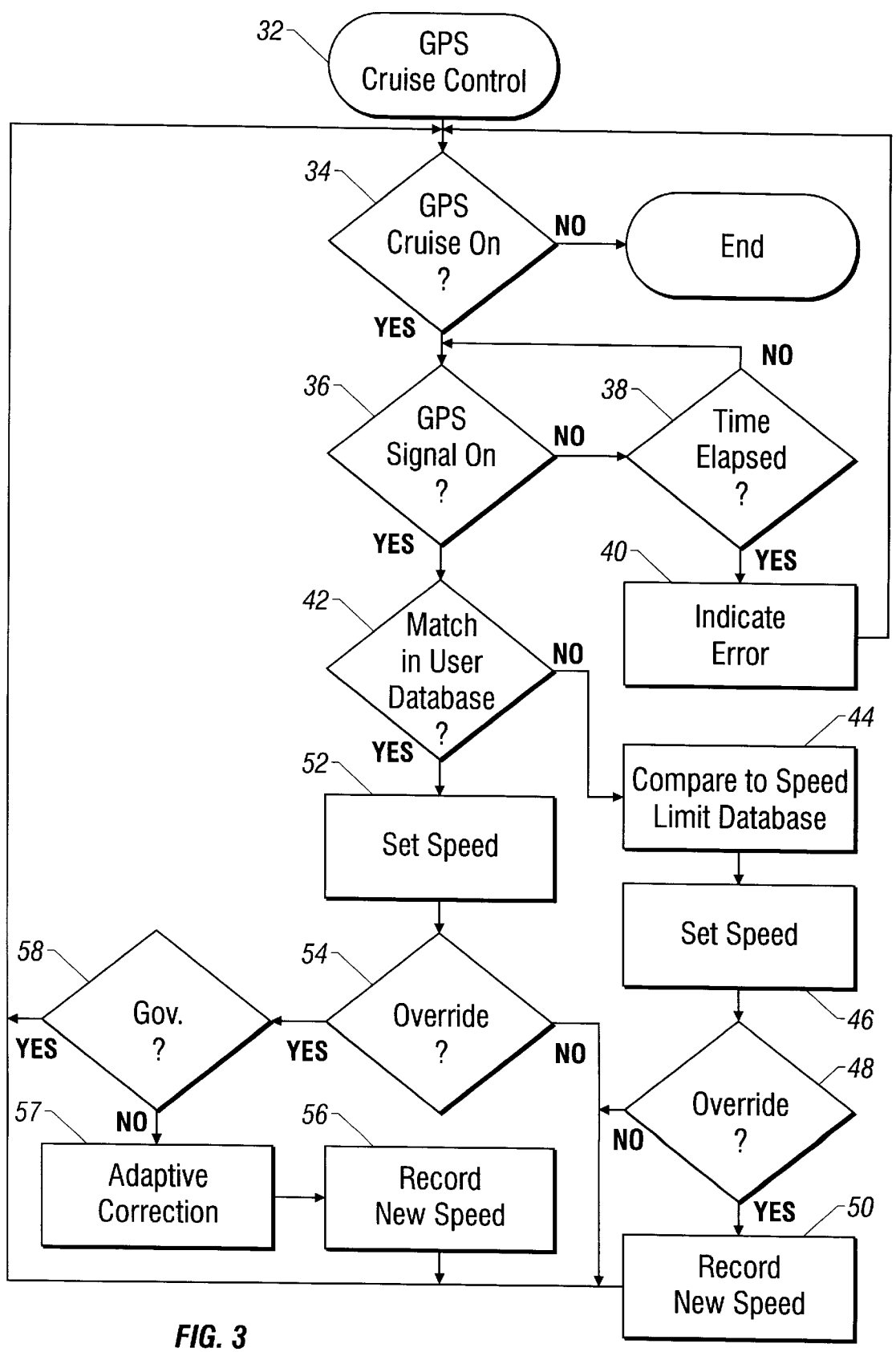
FIG. 3 is a flow chart for software for controlling the automatic cruise control shown in FIG. 1 in accordance with one embodiment.

Referring now to FIG. 3, software 32, which may be stored in the memory 28, may implement one embodiment of automatic cruise control in accordance with the present invention. Initially, a check at diamond 34 determines whether the automatic cruise control is operated "on". If not, the flow immediately ends. Otherwise, a check at diamond 36 determines whether a current location system signal, such as a GPS position signal, has been acquired. If so, the current position is compared (diamond 42) to entries in a user database which may be stored for example, in the memory 28. If there is a match, the database speed may be set in accordance with the existing speed from prior trips (block 52). That speed may also be adjusted based on the actual time of day information. For example, the system may operate at a speed that was recorded at the time closest to the current time.

As indicated at diamond 54, the proposed speed may be overridden. This may be done by accelerating beyond the proposed speed or by decelerating below it. In such case, the new speed may be recorded, as indicated in block 56, and may thereafter be used as the speed for a given location at a given time. However, if the speed governor is active (diamond 58) increased speed may be prevented.

In addition, if the operator repeatedly overrides the system, the system may store a profile for the operator. The operator profile may be developed by analyzing the operator overrides and adaptively adjusting the system's proposals based on that profile, as indicated in block 57.

If no GPS signal was acquired at diamond 36, a check can be undertaken at diamond 38 to determine if a predetermined time period has elapsed. If not, the flow recycles through diamond 36. Otherwise an error is indicated as provided in block 40. The error may indicate that the system is having trouble acquiring the GPS position signal, thereby warning the user that the system may not be completely operational for a given period of time.

If no match is found in the user's own database of prior speeds, the current location may be compared to a speed limit database (block 44). The database may provide information about speed limits on existing roads and highways correlated to their GPS coordinates. In such case, the speed for a given location found in the speed limit database may be set as indicated in block 46. Again this speed may be overridden, as suggested in diamond 48, and in such case, a new actual speed may be recorded and stored in the user database of actual previous speed history (block 50). Repeated overrides may be evaluated by the system, and the system may suggest developing a profile for the operator which automatically overrides the existing information using inferences from the operator overrides.

Figure 4:
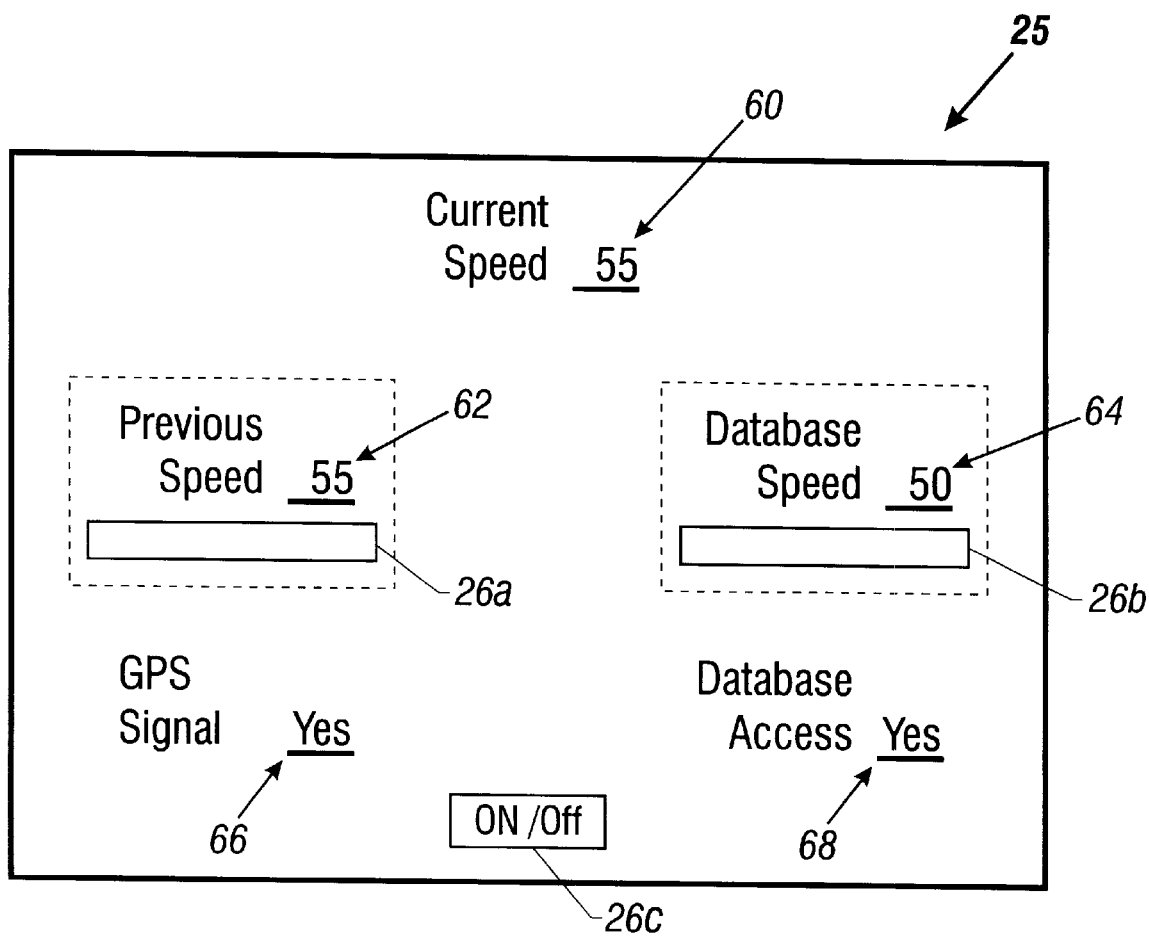
FIG. 4 is an example of a graphical user interface with an integrated key pad in one embodiment of the invention.

Referring now to FIG. 4, one embodiment of the invention for implementing the display 25 and key pad 26 includes a graphical user interface with integrated key pad functions. Display 25 may be located, for example, in the speedometer region of the dashboard, elsewhere on the dashboard, above the dashboard, on the steering column, or other convenient locations. In one illustrated embodiment, the display 25 may include integrated key pad buttons 26*a* through 26*c*. In other embodiments, a touch screen may be used, as another example.

The display 25 may display the current actual speed as indicated at 60. The speed from the memory 28 may be displayed as the previous speed as indicated at 62. A speed suggested from a database over the network connection 30 may displayed at 64. The user may select either the previous speed 62 or the database speed 64 by operating buttons 26*a* or 26*b* associated with the corresponding display icons 62 and 64 respectively.

Additional information may be provided about whether the locating apparatus, such as the GPS receiver, has acquired a good signal, as indicated as 66. When the signal is not adequate, the user may be advised that the previous speed displayed at 62 may not be correct and a previous speed will not be displayed. The user is thereby warned for example by a flashing light or an audible signal that no GPS information is currently being acquired. The system would then operate as a conventional cruise control until good position information is acquired.

An additional indication is provided at 68 as to whether the system has been able to access a speed database. If not, the display warns the user that the database information has not been updated.

In addition, an on/off button 26*c* may be provided. If the user operates the on/off button, the system may either be turned on or if already on, totally disabled. When the system is disabled, the user can control speed through normal operation of brake and accelerator. The user, as with conventional speed controls, can also override any selection made on the system displayed in FIG. 4 by simply operating the desired controls such as the brake or accelerator.

In this way, the user speed may be at least initially set based on prior history, for example, prior speed at the most similar time. The vehicle system may use the driver's previous speed history to make a preliminary assessment of proposed speed. By avoiding excessively rapid transitions to new speeds, the user should have plenty of time to adjust, if a proposed speed exceeds the user's desired speed. Moreover, the various speed combinations for different circumstances may be provided through a network connection 30 for particular real-time driving conditions. For example, in rainy conditions or severe traffic congestion the speeds may be decreased by a given factor.

In addition, the user may be provided with a display which displays the impending speed change. In this way, the user may be prompted to indicate whether or not the user wishes to accept the speed change. In one embodiment, failing action by the user, the speed change may be implemented. If the speed change exceeds a predetermined threshold, the user can be provided a more urgent warning such as an audible warning.

While the present invention has been described with respect to a limited number of embodiments, those skilled the art will appreciate numerous modifications and variations therefrom. It is intended that the appended claims cover all such modifications and variations which fall within the true spirit and scope of the present invention.

What is claimed is:

1. A method comprising:
   determining a position of a vehicle; and
   automatically providing information about a suggested vehicle speed that said vehicle traveled at said position in the past.

2. The method of claim 1 wherein the position of the vehicle is determined using a global positioning system receiver.

3. The method of claim 1 wherein said automatically providing information about a suggested vehicle speed includes comparing speeds for the vehicle's current position with recorded vehicle positions and, if there is a match, providing information about the speed used at a recorded vehicle portion.

4. The method of claim 3 wherein said automatically providing information about a suggested vehicle speed includes comparing the current vehicle position to a database containing information about speed limits at given locations and if there is a match, providing the information about the speed limits.

5. The method of claim 3 further including determining whether a previous speed has been recorded for a given location and if not, using a database containing information about speed limits to propose the suggested vehicle speed.

6. The method of claim 1 further including allowing a motor vehicle operator to override the suggested vehicle speed.

7. The method of claim 1 further including preventing the vehicle from exceeding the suggested vehicle speed.

8. The method of claim 1 including determining the position of the vehicle within a predetermined tolerance and automatically providing information about said suggested vehicle speed any time the vehicle is at that position or within that tolerance.

9. The method of claim 6 including logging each instance when an operator overrides the suggested vehicle speed and analyzing each instance when the operator overrides the suggested vehicle speed and adjusting a suggested speed based on said analyzing of the operator overrides of the suggested vehicle speed.

10. An automatic cruise control comprising:

a position locating device;

a controller that compares a current position of a vehicle with a previous condition;

determining the vehicle speed based on the current position and the speed used at that position in the past; and a memory storing the speeds that the vehicle used at given locations in the past.

11. The control of claim 10 including a network device for enabling the controller to access additional information over a network.

12. The control of claim 10 wherein said controller is a computer system.

13. The control of claim 12 wherein said computer system is an in-car computer system.

14. An article comprising a medium for storing instructions that cause a processor based system to:

determine a position of a vehicle; and automatically provide information about a suggested vehicle speed previously traveled at said position.

15. The article of claim 14 wherein said storing instructions that cause a processor based system to determine the position of the vehicle using a global positioning system receiver.

16. The article of claim 14 wherein said storing instructions that cause a processor based system to compare speeds for the vehicle's current position with recorded vehicle positions and, if there is a match, provide the previous speed as the suggested vehicle speed.

17. The article of claim 16 wherein said storing instructions that cause a processor based system to compare the current vehicle position to a database containing information about speed limits at given locations and if there is a match, provide the information about speed limits.

18. The article of claim 16 wherein said storing instructions that cause a processor based system to determine whether a speed has been previously recorded for a location and if not, use a database containing information about speed limits to propose said suggested vehicle speed.

19. The article of claim 14 wherein said storing instructions that cause a processor based system to allow a motor vehicle operator to override the suggested vehicle speed.

20. The article of claim 14 wherein said storing instructions that cause a processor based system to prevent the vehicle from exceeding the suggested vehicle speed.

21. The article of claim 14 wherein said storing instructions that cause a processor based system to determine the position of the vehicle within a predetermined tolerance and automatically provide information about a suggested vehicle speed any time the vehicle is within a given tolerance of that position.

22. The article of claim 19 wherein said storing instructions that cause a processor-based system to log each instance when an operator overrides the suggested vehicle speed and analyze each instance when the operator overrides the suggested vehicle speed and adjust a suggested speed based on said analysis of the overrides of the suggested vehicle speed.

* * * * *